(12) United States Patent
Capman et al.

(10) Patent No.: US 8,879,622 B2
(45) Date of Patent: Nov. 4, 2014

(54) INTERACTIVE SYSTEM AND METHOD FOR TRANSMITTING KEY IMAGES SELECTED FROM A VIDEO STREAM OVER A LOW BANDWIDTH NETWORK

(75) Inventors: François Capman, Versailles (FR); Erwann Renan, Paris (FR); Cédric Le Barz, Limours en Hurepoix (FR)

(73) Assignee: Thales, Neuilly sur Seine (FR)

( * ) Notice: Subject to any disclaimer, the term of this patent is extended or adjusted under 35 U.S.C. 154(b) by 654 days.

(21) Appl. No.: 13/141,658
(22) PCT Filed: Dec. 16, 2009
(86) PCT No.: PCT/EP2009/067300

§ 371 (c)(1),
(2), (4) Date: Sep. 6, 2011

(87) PCT Pub. No.: WO2010/072636

PCT Pub. Date: Jul. 1, 2010

(65) Prior Publication Data

US 2011/0317066 A1    Dec. 29, 2011

(30) Foreign Application Priority Data

Dec. 23, 2008  (FR) ...................................... 08 07407

(51) Int. Cl.
| | | |
|---|---|---|
| *H04N 7/12* | (2006.01) | |
| *H04N 19/33* | (2014.01) | |
| *H04N 19/179* | (2014.01) | |
| *H04N 19/587* | (2014.01) | |
| *H04N 19/37* | (2014.01) | |
| *H04N 19/177* | (2014.01) | |
| *H04N 19/61* | (2014.01) | |
| *H04N 19/29* | (2014.01) | |
| *H04N 19/159* | (2014.01) | |
| *H04N 19/114* | (2014.01) | |
| *H04N 19/192* | (2014.01) | |
| *H04N 19/39* | (2014.01) | |
| *H04N 19/107* | (2014.01) | |
| *H04N 19/142* | (2014.01) | |
| *H04N 19/172* | (2014.01) | |
| *H04N 19/87* | (2014.01) | |
| *H04N 19/132* | (2014.01) | |

(52) U.S. Cl.
CPC ... *H04N 19/00163* (2013.01); *H04N 19/00436* (2013.01); *H04N 19/0029* (2013.01); *H04N 19/00751* (2013.01); *H04N 19/00454* (2013.01); *H04N 19/00284* (2013.01); *H04N 19/00781* (2013.01); *H04N 19/00418* (2013.01); *H04N 19/00218* (2013.01); *H04N 19/00054* (2013.01); *H04N 19/00357* (2013.01); *H04N 19/0046* (2013.01); *H04N 19/0003* (2013.01); *H04N 19/00266* (2013.01); *H04N 19/00921* (2013.01); *H04N 19/00127* (2013.01)

USPC ............ 375/240.01; 375/240.02; 375/240.03; 375/240.04; 375/240.05; 375/240.06; 375/240.07; 375/240.08; 375/240.09

(58) Field of Classification Search
CPC ................... H04N 19/00163; H04N 19/0029; H04N 19/00054; H04N 19/00921
USPC .......................... 375/240.01, 240.02–240.09
See application file for complete search history.

(56) References Cited

U.S. PATENT DOCUMENTS 6,370,423 B1 *  4/2002  Guerrero et al. ............... 600/513
6,404,907 B1 *  6/2002  Gilchrist et al. ............... 382/129

(Continued)

FOREIGN PATENT DOCUMENTS

| FR | 2 891 686 A1 | 4/2007 |
|---|---|---|
| WO | 2004/114672 A1 | 12/2004 |
| WO | 2007/047755 A1 | 4/2007 |
| WO | 2007/078801 A1 | 7/2007 |

OTHER PUBLICATIONS

Koprinska et al, Temporal video segmentation: A survey, 2001.*

(Continued)

*Primary Examiner* — Andy Rao
*Assistant Examiner* — Shan Elahi
(74) *Attorney, Agent, or Firm* — Baker Hostetler LLP

(57) ABSTRACT

A method and interactive system for the on-line transmission of a high-resolution video sequence composed of a succession of T images includes a step of selecting relevant images comprising at least the following steps: split each image to be transmitted at the instant t into a number N of zones, for each zone n determined in the previous step, calculate a value representative of the content of said zone, for each image to be transmitted, generate a vector representative of the content of said image containing the values obtained in the previous step, calculate a normalized coefficient of correlation α between the reference vector determined for a previously selected image and that calculated for the current image, make a decision on the selection (or not) of the current image as a function of the value of the normalized correlation coefficient α.

18 Claims, 6 Drawing Sheets

(56) References Cited

U.S. PATENT DOCUMENTS

| | | | |
|---|---|---|---|
| 2002/0138013 A1* | 9/2002 | Guerrero et al. | 600/509 |
| 2003/0038798 A1* | 2/2003 | Besl et al. | 345/420 |
| 2004/0059203 A1* | 3/2004 | Guerrero et al. | 600/300 |
| 2004/0217956 A1* | 11/2004 | Besl et al. | 345/419 |
| 2005/0190872 A1* | 9/2005 | Seong et al. | 375/354 |
| 2005/0195898 A1* | 9/2005 | Moon et al. | 375/240.15 |
| 2006/0206033 A1* | 9/2006 | Guerrero et al. | 600/523 |
| 2006/0209963 A1* | 9/2006 | Valente | 375/240.24 |
| 2006/0262345 A1* | 11/2006 | Le Leannec et al. | 358/1.15 |
| 2008/0232468 A1 | 9/2008 | Kwon et al. | |
| 2008/0232687 A1* | 9/2008 | Petersohn | 382/173 |

OTHER PUBLICATIONS

Štruc et al, The Corrected Normalized Correlation Coefficient: A Novel Way of Matching Score Calculation for LDA-Based Face Verification, 2008.*

Irena Koprinska, et al., "Temporal Video Segmentation: A Survey", Signal Processing: Image Communication, Jan. 1, 2001, pp. 477-500, vol. 16, No. 5, Elsevier Science Publishers, Amsterdam, NL, XP004224651.

* cited by examiner

INTERACTIVE SYSTEM AND METHOD FOR TRANSMITTING KEY IMAGES SELECTED FROM A VIDEO STREAM OVER A LOW BANDWIDTH NETWORK

CROSS-REFERENCE TO RELATED APPLICATIONS

This application is a National Stage of International patent application PCT/EP2009/067300, filed on Dec. 16, 2009, which claims priority to foreign French patent application No. FR 0807407, filed on Dec. 23, 2008, the disclosures of which are incorporated by reference in their entirety.

FIELD OF THE INVENTION

The invention relates to an interactive system and a method for transmitting images and videos over constrained-bitrate networks. More precisely, it addresses the issues of transmitting high-resolution relevant images within a video sequence over low-bitrate networks.

The invention can, inter alia, be used in applications implementing the standard defined in common by the ISO MPEG and the video coding group of the ITU-T termed H.264 or MPEG-4 AVC (advanced video coding) which is a video standard providing more effective compression than the previous video standards while exhibiting reasonable complexity of implementation and geared toward network applications. It also applies within the framework of systems for transmitting images using the JPEG 2000 standard and the JPIP communication protocol (JPEG2000 Interactive Protocol).

BACKGROUND

One of the problems to be solved resides in the fact of being able to transmit high-resolution video sequences over constrained-bitrate networks. Indeed, a high-resolution video sequence, even after compression via a suitable source coding device exhibits a useful bitrate which often exceeds the capacity of the transmission channel, notably that of wireless networks. One solution consists in selecting and transmitting within the sequence only certain images at a lower resolution but the problems then arise of selecting relevant images in the sequence so as to transmit almost all the useful information contained in the video. Another problem to be solved relates to the transmission procedure to be implemented to transmit and recover, receiver side, the high-resolution images. Moreover, the implementation of a form of interactivity between the remote operator and the sender so as to select only a part of the video stream for transmission exhibits appreciable advantages so as, for example, to adapt the transmission to the requirements of the operator, and to thus transmit only the information deemed relevant. Finally, the concern over implementational complexity is an important point to be taken into account in achieving a global solution which satisfies, notably, the real-time constraints inherent in interactive multimedia applications.

Hereinafter in the text, the expression "relevant images" or "key images" will refer to a subset of selected images within a video sequence and exhibiting a greater priority from the point of view of the end user. In the context of a transmission of said video sequence on a low-bitrate network, the relevant images are, for example, those which exhibit a significant mutual difference in content. In the context of the compression of said video sequence by a suitable video coder, the key images are also those which will be compressed in the most effective manner so as to guarantee their final quality in terms of visual rendition, once decompressed. Accordingly, a summary of a video sequence corresponds to the set of "relevant images" or "key images" of said sequence.

Selecting Relevant Images in a Video Stream

The issue of selecting relevant images within a video sequence is often handled, in the prior art, by way of solutions which consist in creating a summary of said sequence by taking into account the global content of the video. For example, patent application US2008/0232687 describes a procedure making it possible to select key images within a video sequence. This procedure also allows the temporal segmentation of the sequence so as to produce several scenes. This type of method is not suited to the real-time broadcasting of a video stream since it requires the processing of the entire sequence to produce the set of associated key images. On the contrary, the constraints related to video transmission make it necessary to process the images on the fly, the procedure for selecting key images then benefits as point of entry only from the current image and optionally its temporally close neighbors, in particular the previous images if it is desired to minimize the transmission delay.

Video Stream Compression Techniques

A video sequence, by its very nature, comprises considerable statistical redundancy both in the temporal domain and the spatial domain. The wish to make ever more effective use of the passband of the transmission media over which these sequences travel and the objectives of reducing their storage cost, very soon raised the question of video compression. The conventional video compression techniques can generally be divided into two steps. The first is aimed at reducing spatial redundancy and therefore at compressing a still image. The image is firstly divided into blocks of pixels (4×4 or 8×8 according to the MPEG-1/2/4 standards), a switch to the frequency domain followed by quantization makes it possible to approximate or to remove the high frequencies to which the eye is less sensitive, and finally the quantized data are entropically coded. The aim of the second is to reduce the temporal redundancy. This technique makes it possible to predict an image on the basis of one or more other reference images(s) previously processed within the same sequence (motion prediction). This technique consists in searching through these reference images for the block to which it is desired to apply a prediction, and only a motion estimation vector corresponding to the displacement of the block between the two images, as well as a residual error making it possible to refine the visual renditions, are retained.

Temporal Granularity in a Video Standard

A stream of data compressed according to a procedure allowing temporal granularity, or "a temporally scalable compressed bit-stream", follows a coding scheme of hierarchical type. This hierarchy in the coding scheme allows the definition of sets of images which are accessible by grade or temporal resolution. The first grade, called "base resolution", is the minimum sequence allowing degradation-free reconstruction of the frames of which it is composed. The other grades correspond to refinements of this base sequence. Generally the refinement grades have frame frequencies which are multiples of that of the base frequency, the ratio between these frame frequencies is then called the scale factor. In an example of a sequence with 30 frames per second following a coding scheme with a temporal granularity of scale factor equal to two and graded in three levels, a first level of resolution (base resolution) would be obtained, corresponding to a video content at 7.5 frames per second. In this example, if the base subsets and also that of the first refinement level are accessible, then a video content with 15 frames per second is achievable. If the last refinement level is added, a video content with the original temporal resolution (30 frames per second) is achievable. Each of these subsets is assumed to correspond to effective compression of the information that it contains. FIG. 1 shows diagrammatically an example of temporal granularity. The base level (0) corresponds to the minimum temporal resolution which is transmitted. Within the framework of video transmission, the code stream corresponding to the base level represents the minimum information that must be received by the recipient and must therefore be compressed to ensure the fewest possible losses during transmission. Typically, the images contained in this base temporal resolution are encoded independently. The temporal resolutions of higher levels (refinement level 1 and 2) may be encoded by implementing a prediction with respect to the images of the base resolution (0). A prediction is possible between images belonging to the base resolution, on the other hand the images contained in the base temporal resolution may not be predicted on the basis of an image contained in another refinement level.

JPIP Standard

The JPIP standard (JPEG 2000 Interactive Protocol) defines a protocol dedicated to the progressive transmission of images in accordance with the JPEG 2000 standard. It makes it possible to exploit the various granularity levels proposed by JPEG 2000 (spatial granularity, granularity in terms of resolution, and in terms of quality). Indeed, subsequent to a request made by the operator, only the information necessary to satisfy this request is transmitted, doing so in a progressive manner in terms of quality. The use of the JPIP protocol combined with the JPEG 2000 standard makes it possible not to retransmit the already transmitted information. Thus the resources in terms of bitrate transmitted and complexity of processing of the two sides of the transmission chain are lightened. Moreover, the dispatching of the information being hierarchized, it is possible to rapidly view a part of the image with a low quality, said quality growing in a progressive manner as new information is received.

This standard may be used to perform interactive transmission with optimization of the bitrate in the case of a transmission of JPEG2000 images but does not make it possible to implement the same type of method for video transmission based on a different standard. In particular, the selection of an image by the operator within a video stream transmitted is not taken into account by this protocol.

The prior art, such as described previously, does not make it possible to solve a certain number of problems, notably high-resolution information transmission in a network exhibiting a constrained bitrate. Interactive access to an image, or to a zone of an image, within a video stream transmitted in real time is not covered by the state of the art either.

In order to deal with the limitations of the prior art, the invention proposes a new approach which consists in working only on images which are under-resolved and under-sampled temporally in an intelligent manner so as to reduce to the maximum the redundancy and to adapt to the required passband. The proposed solution also allows the analysis of this under-resolved sequence in an interactive manner via requests performed by a remote operator. The present invention is compatible with the following standards. The H.264 standard is defined by ISO/IEC standard 14496-10. The JPEG 2000 standard is defined by ISO/IEC standard 15444-1. The JPIP standard is defined by ISO/IEC standard 15444-9.

SUMMARY OF THE INVENTION

Accordingly the subject of the invention is a method of on-line transmission of a high-resolution video sequence composed of a succession of T images, characterized in that it comprises at least one step of selecting relevant images comprising at least the following steps:

Step 1: Split each image to be transmitted at the instant t into a number N of zones, Step 2: For each zone n determined in step 1, calculate a value $v_n(t)$ representative of the content of said zone, Step 3: For each image I(t) to be transmitted, generate a vector $V_N(t)$ of size N representative of the content of said image and containing the values obtained in step 2 for each of the zones determined in step 1, $V_N(t)=[v_0(t), \ldots, v_{N-1}(t)]^T$, $[.]^T$ being the transposition operator for a vector.

Step 4: Calculate a normalized coefficient of correlation $\alpha$ between the reference vector $R_N(k)=V_N(t_1)=[r_0(k), \ldots, r_{N-1}(K)]^T$ determined for an image previously selected at the instant $t_1$ $I^{sel}(k-1)=I(t_1)$ and that $V_N(t)$ calculated for the current image I(t) via the following calculation:

$$\alpha = \frac{R_N^T(k-1) \cdot V_N(t)}{\sqrt{R_N^T(k-1) \cdot R_N(k-1)} \cdot \sqrt{V_N^T(t) \cdot V_N(t)}},$$

where k is the temporal index of a selected image.

Step 5: Make a decision on the selection (or not) for transmission of the current image I(t) by comparing the value of the normalized correlation coefficient $\alpha$ with one or more thresholds having values fixed a priori.

In a variant embodiment of the invention, the value $v_n(t)$ calculated in step 2 is obtained by calculating one of the criteria derived from a histogram containing the luminance or chrominance values of the pixels of the zone n of the image I(t)—said criteria including: the energy, the variance, the damping coefficient (or Kurtosis), the asymmetry coefficient (or Skewness) or the center of gravity of said histogram—or by performing a linear combination of at least two of these criteria.

In a variant embodiment of the invention, the step of selecting relevant images additionally comprises the following steps:

On the basis of each pair of vectors $(R_N(k-1), V_N(t))$, obtained for the pair of images $(I^{sel}(k-1), I(t))$, calculate a second vector $\Delta V_N(t)=(\Delta v_0(t), \ldots, \Delta v_N(t))$ such that $\Delta v_n(t)=|v_n(t)-r_n(k-1)|^\beta$, $\beta$ being a given positive integer.

Calculate the norm $\|\Delta V_N(t)\|$ of the vector $\Delta V_N(t)$ and divide said vector by said norm to obtain a third vector $$\Delta' V_N(t) = \frac{\Delta V_N(t)}{\|\Delta V_N(t)\|} = (\Delta v'_0(t), \ldots, \Delta v'_N(t)).$$

Calculate the following extra criterion so as to determine whether there is uniform or localized distribution of the differences between the two images considered:

$$DC = \left(\Delta V_N^{MAX} - \frac{1}{N}\right) \bigg/ \left(1 - \frac{1}{N}\right),$$

with $\Delta V_N^{MAX}=\text{MAX}(\Delta v'_n(t)), 0 \leq n < N$, apply the following test, if $DC < S_{DC}$, the differences between the two images considered are uniformly distributed, otherwise they are localized in a given zone of said images.

In a variant embodiment of the invention, step 5 is implemented by performing a test of comparison between the correlation coefficient α and a predefined threshold S, a strictly positive integer, in the following manner:
  if α<S, the current image I(t) is selected, the reference vector is updated $R_N(k)=V_N(t)$ and the selected image index is incremented k=k+1
  in the converse case, the image is not retained as relevant image.

In a variant embodiment of the invention, the step of selecting relevant images comprises the following additional steps:
  Define an image counter cpt_I, initialized to 1 when a relevant image is selected in step 5 and incremented by 1 with each new current image I(t) received as well as a maximum value of said counter cpt_I_max,
  For each image, perform the following comparison test: if α≥S and cpt_I≥cpt_I_max, select said image as relevant.

In a variant embodiment of the invention, the step of selecting relevant images comprises the following additional steps:
  Define an image counter cpt_I, initialized to 1 when a relevant image is selected in step 5 and incremented by 1 with each new current image I(t) received and a minimum value of said counter cpt_I_min,
  For each image, perform the following comparison test: if α<S and cpt_I<cpt_I_min, do not retain said image as relevant.

In a variant embodiment of the invention, the step of selecting relevant images comprises the following additional steps:
  Define a desired number $N_S$ of images selected per second,
  Define a time interval of duration equal to $T_h$ for the updating of said threshold S.
  At each time interval of duration equal to $T_h$, calculate the number of images N selected by the method during said previous time interval of duration equal to $T_h$,
  At each time interval of duration equal to $T_h$, modify the value of the threshold S in the following manner:

If $N<N_S, S=S-\delta S$

If $N>N_S$, $S=S+\delta S$, where δS is an initially fixed and/or dynamically adjusted incremental positive integer value.

In a variant embodiment of the invention, step 5 consists in performing a test of comparison between the correlation coefficient α and a strictly positive number J of predefined thresholds $S_j$, 1≤j<J, in the following manner:
  If $0 \leq \alpha < S_1$, the current image is selected with a maximum degree of priority,
  If $S_j \leq \alpha < S_{j+1}$, for 1≤j<J−1 the current image is selected with a mean degree of priority j,
  If $\alpha \geq S_J$, the image is not retained as relevant, $S_j$ is a strictly positive integer.

In a variant embodiment of the invention, step 5 is performed in the following manner:
  Sort the T images of said video sequence in ascending order of the value of their correlation coefficient α,
  Group the T sorted images into J+1 groups hierarchized as a function of the value of α, each of said groups of images comprising the same number of images and corresponding to a mean degree of priority j'.

In a variant embodiment of the invention, the high-resolution video sequence is compressed before transmission via the following steps:
  Perform a spatial under-sampling of said high-resolution video stream so as to obtain a video sequence of lower resolution,
  Apply the step of selecting relevant images to the video sequence of lower resolution obtained,
  Perform a compression of said sequence by a video coder suitable for generating a particular structure of group of images, in which the relevant images selected define:
    a temporal resolution, containing the set of relevant images selected in the case where the step of selecting relevant images delivers only one group of relevant images all having the same degree of priority,
    several temporal resolutions, each containing the relevant images selected with a different degree of priority, in the case where the step of selecting relevant images delivers several groups of relevant images with different degrees of priority.

In a variant embodiment of the invention, the video coder conforms to the H.264 standard.

In a variant embodiment of the invention, the high-resolution video sequence to be transmitted is saved in a storage unit and that an image or image zone of said video sequence is selected so as to be transmitted or retransmitted according to the following steps:
  Perform a spatial over-sampling of said image so as to obtain a high-resolution image,
  Calculate the difference between the over-sampled image and the corresponding one previously stored so as to obtain a residual,
  Compress said residual via an image coder so as to produce a compressed stream comprising at least packets which contain an information on the high frequencies of the image and other packets which contain an information on the low frequencies of said image,
  Transmit said compressed stream to a remote operator.

In a variant embodiment of the invention, the image to be retransmitted or the image associated with said image zone to be retransmitted is compared with its temporally neighboring images within said high-resolution video sequence so as to determine which is the least blurred according to the following steps:
  Calculate on the image or the image zone selected a criterion representative of the sharpness of said image or image zone, said sharpness criterion exhibiting a first extremum when said image or image zone is perfectly sharp and a second extremum opposite to the first when said image or image zone is totally blurred,
  Perform the same calculation on the M temporally neighboring images, M being a predefined value,
  Select the sharpest image according to the previous criterion and retransmit this image or the associated image zone, in place of the one initially selected.

In a variant embodiment of the invention, the image coder is suitable for defining the order of dispatching of the packets making up the compressed stream as a function, at least, of an information regarding available bitrate for transmission and fixed a priori.

In a variant embodiment of the invention, the image coder conforms to the JPEG2000 standard.

In a variant embodiment of the invention, the retransmission of an image or image zone is done via a request from the remote operator.

In a variant embodiment of the invention, the requests and the responses to said requests are implemented via the JPIP standard.

The subject of the invention is also an interactive system for transmitting high-resolution video sequences, characterized in that it comprises a sender and a receiver comprising means for executing the steps of the method described previously.

BRIEF DESCRIPTION OF THE DRAWINGS

Other characteristics and advantages of the method and of the device according to the invention will be more apparent on reading the description which follows of an exemplary embodiment given by way of wholly nonlimiting illustration together with the figures which represent.

DETAILED DESCRIPTION

Figure 1:
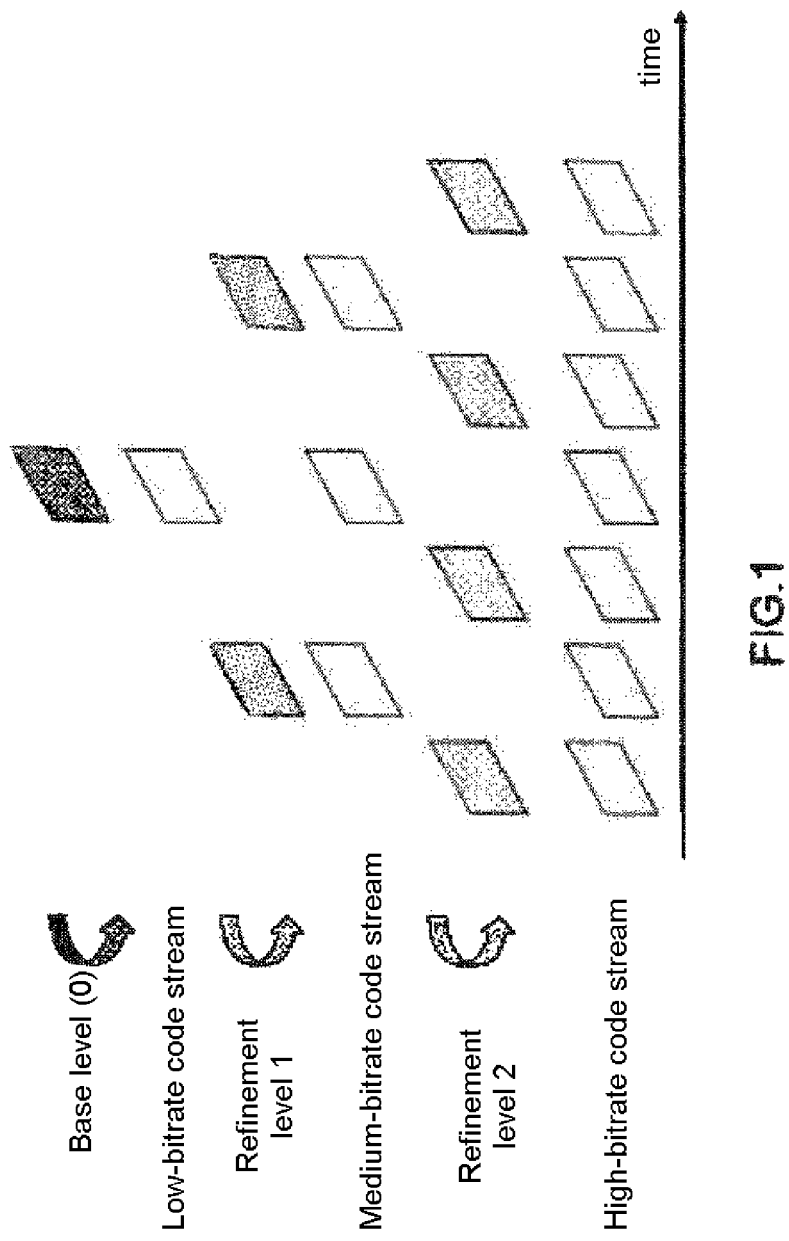
FIG. 1 an illustration of the temporal granularity in a video stream.
Figure 2:
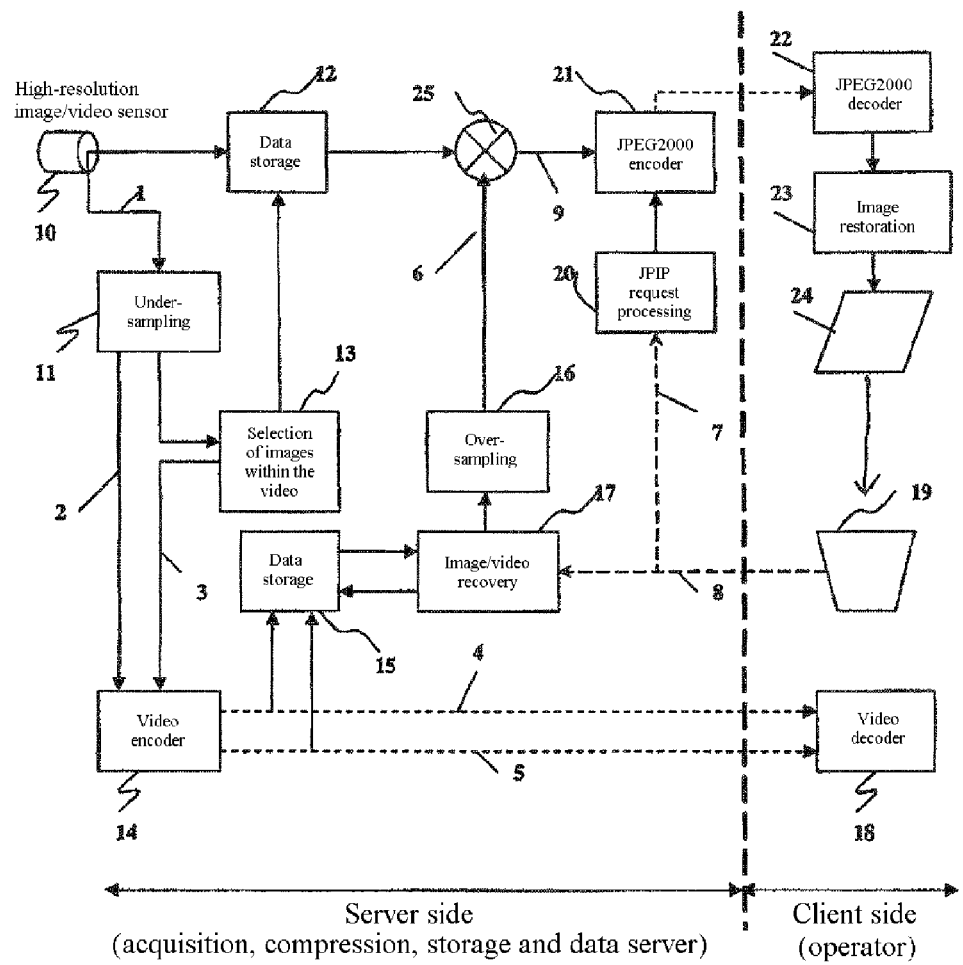
FIG. 2 a schematic of the system for interactively transmitting images and videos on a low-bitrate network according to the invention, FIG. 3 an illustration of the method for selecting relevant images according to the invention, FIG. 4 an illustration of a variant embodiment of the method for selecting relevant images according to the invention, FIG. 5 an illustration of an exemplary depiction of a temporal granularity scheme with a constraint on the key images, FIG. 6 an illustration of bitrate allocation and of distortion for each temporal resolution, FIG. 7 an illustration of a region of interest in an image.

FIG. 2 represents a diagram of the overall system according to the invention. In the left part of the figure is illustrated the system for acquisition, compression, storage and data server. The right part of the figure corresponds to the remote operator or expert who makes the requests to the sender. The dashed arrows signify that there is transmission (either of video data or images, or of user requests) through a network with known constrained bitrate.

A high-resolution video sequence, 1, arising from a sensor, 10, is firstly spatially under-sampled, 11, so as to reduce the initial resolution and indirectly the useful bitrate of the sequence to be transmitted. In parallel, the sequence, 1, is also stored locally in a storage unit 12. A method, according to the invention, for selecting relevant images, 13, recovers the under-sampled stream, 2, so as to produce a summary of the video sequence, doing so in real time. This summary makes it possible to determine which are the key images, 3, within the sequence. Said sequence of key images, 3, thus obtained is a string of images wherein the content between each image differs significantly. For each transmitted image, the selection method, 13, determines whether it is a key image and provides this indication to the video encoder 14. Said encoder therefore has at its input an under-sampled stream, 2, and an indication of key image, 3, and uses these two sources of information to produce two compressed video streams. The first stream, 4, corresponds to the base temporal resolution or low-resolution sequence, which must necessarily contain the previously determined key images. The second, 5, corresponds to the entire video stream, spatially under-sampled and then encoded. At least one of these two streams is transmitted, through a constrained-bitrate network, to the remote video decoder, 18, which performs the decoding and generates a decompressed video sequence which may be displayed. The choice to transmit one or the other of the available streams depends on the operator and on the available passband. The stream, 4, corresponding to the base temporal resolution will be transmitted by priority. The two compressed streams are also stored in a storage unit, 15, before being transmitted. In the case where a video coder of H.264 type is used, only the priority stream, 4, is stored.

On the reception side, an operator, 19, can make several types of requests to the video server. A first request, 8, allows the operator to ask for the retransmission of a specific image or the set of key images with the original resolution (associated with the sensor 10). This request can also be made on a part of an image, so as to perform a zoom on a precise element that the operator desires to display in high resolution. The request 8 is therefore transmitted to a step 17 which performs the recovery of the image, of the group of images or of the image part requested. The recovered image is therefore decoded on the basis of the stream stored in the storage unit 15 and is then spatially over-sampled, 16, so as to return to the original resolution. The difference, 25, between the original high-resolution image (or the image part) previously stored in the unit, 12, and the over-sampled image (or the image part), 6, is calculated so as to obtain a residual, 9.

Said residual obtained is thereafter compressed via an image encoder, 21, conforming, for example, to the JPEG2000 standard. It is this residual which is thereafter transmitted to the operator via, for example, the use of the JPIP bidirectional protocol, 7. On reception, the stream is decoded progressively via an image decoder, 22, the decoded residual thus obtained is communicated to an image restoration module, 23, which on the basis of this residual and of the first low-quality and low-resolution image that it has received (that which allowed it to make its request to obtain complementary information) provides a complete decompressed image to the operator. The latter will thus be able to progressively reconstruct the part of the image that he desires to analyze, doing so up to full resolution and maximum quality thereof.

The operator 19 can interact with the system according to the invention according to several scenarios. For example, he desires the retransmission at high resolution of an image or of an image zone already transmitted at low resolution. The operator 19 can also request the transmission of the video stream or of the high-resolution images between two images already transmitted at low resolution.

The method, according to the invention, for selecting relevant images, 13, makes it possible to determine, in real time and during transmission of the video stream, the key images of the video sequence. The set of these images represents a summary of the information of the high-resolution initial sequence. In the subsequent description, the following notation will be used:

T is the total number of images of the processed video sequence, t is the temporal index associated with an image of said sequence, N is the number of image zones which is determined by the method, n is the index of a zone, K is the number of images selected via the method from among the T available images, k is the temporal index associated with an image from among the set of selected images.

The current image of the processed video sequence is denoted I(t)

The method for selecting relevant images exhibits the following steps:

Step 1: Each image I(t) received at the instant t is split up into a number N of zones which can vary, typically N is for example an integer number greater than 9.

Step 2: With each zone n is associated a value $v_n(t)$ representative of the content of this zone of the image and obtained according to a precise criterion.

Step 3: A vector $V_N(t)$ of size N representative of the content of the image I(t) is generated by concatenating the values obtained in step 2 for each zone of the image: $V_N(t)=[v_0(t), \ldots, V_{N-1}(t)]^T$ where $[.]^T$ is the transposition operator. When a current image of index t is selected by the method for selecting relevant images, a reference vector is updated:

$$R_N(k)=V_N(t)=[r_0(k), \ldots, r_{N-1}(k)]^T$$

The image selected is denoted $I^{sel}(k)=I(t)$ and for each new image selected by the method according to the invention, k is incremented by 1 (k=k+1).

Step 4: A normalized coefficient of correlation $\alpha$ is calculated between the reference vector $R_N(k-1)$ determined for the previously selected image $I^{sel}(k-1)$ and the vector $V_N(t)$ representative of the content of the current image I(t)

$$\alpha = \frac{R_N^T(k-1) \cdot V_N(t)}{\sqrt{R_N^T(k-1) \cdot R_N(k-1)} \cdot \sqrt{V_N^T(t) \cdot V_N(t)}}$$

or else $$\alpha = \frac{\sum_{n=0}^{N-1} r_n(k-1) \cdot v_n(t)}{\sqrt{\sum_{n=0}^{N-1} r_n(k-1) \cdot r_n(k-1)} \cdot \sqrt{\sum_{n=0}^{N-1} v_n(t) \cdot v_n(t)}}$$

Step 5: A test of comparison is performed between the correlation coefficient $\alpha$ and a predefined threshold S. If $\alpha<S$, the current image I(t) is selected, the reference vector is updated $R_N(k)=V_N(t)$ and the index k is incremented by 1. In the converse case, the image is not retained as relevant.

Figure 3:
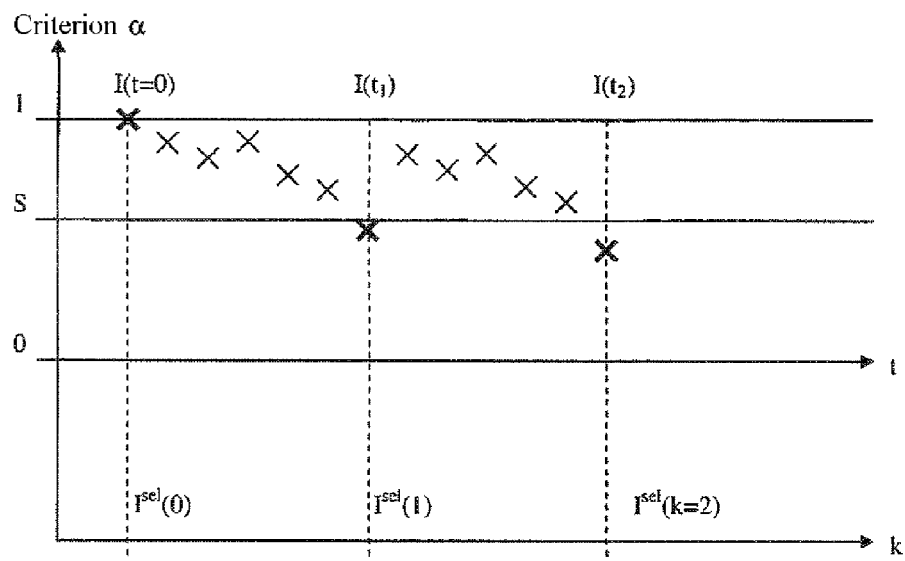

The method such as implemented via steps 1 to 5 described previously is illustrated in FIG. 3. The method is initialized by selecting the first image $I^{sel}(0)=I(t=0)$ of the sequence and then a new image $I^{sel}(k)=I(t_1)$ is selected each time that its associated criterion $\alpha$ is less than the threshold S.

Figure 4:
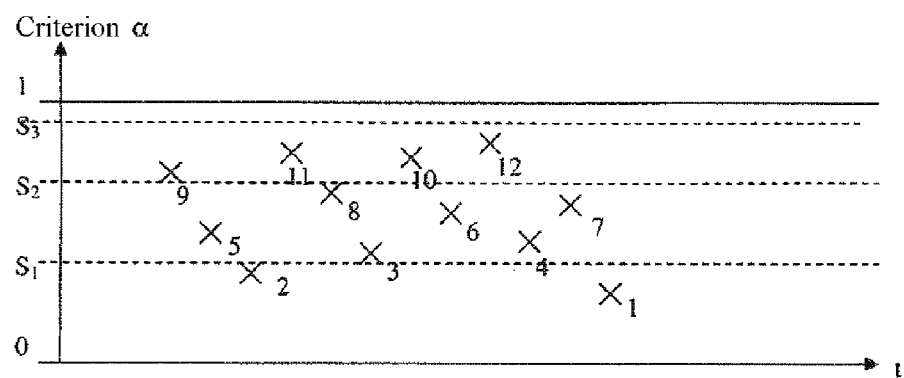

In a variant embodiment, it is possible to define J thresholds $S_j$ ($1 \leq j \leq J$ and $S_j<S_{j+1}$) so as to select J+1 groups of images. Said groups obtained will be hierarchized as a function of their degree of priority. For example, for J=3, the group of images such that $0 \leq \alpha < S_1$ has the highest priority, the second group of images in the order of priority is that obtained for $S_1 \leq \alpha < S_2$ and so on and so forth. Another possibility for obtaining J+1 groups of images consists in dividing the set of available images into J+1 groups each comprising an equal number of images, the distributing of the images into each group is done by hierarchizing the images as a function of the value of their associated criterion $\alpha$. FIG. 4 illustrates this variant embodiment in the case where 12 images are initially available. Three groups of images are defined by the selection method according to the invention. In one case, the thresholds $S_1$, $S_2$ and $S_3$ are used to determine the distribution of the images in the three groups. Group 1 contains the images (represented by their temporal index) {1,2}, group 2 contains the images {3,4,5,6,7,8} and group 3 contains the images {9,10,11,12}. In the second case, the images are hierarchized as a function of the value of their criterion $\alpha$ and are grouped into three groups containing as many elements each. Group 1 then contains the images {1,2,3,4}, group 2 contains the images {5,6,7,8} and group 3 contains the images {9,10,11,12}.

The value $v_n(t)$ representative of the content of a zone n of an image received at the instant t as well as the vector representative of said image $V_N(t)$ may be calculated according to various criteria such as described in the following paragraph.

A possible criterion is a criterion based on the mean luminance of the image. In this case, each value $v_n(t)$ is equal to the mean value of the luminance calculated over the zone n of the image I(t). This criterion is usable but its performance is strongly conditioned on the quantization spacing used for the luminance distribution function. The method according to the invention makes it possible to improve the performance of this criterion by modeling the distribution of the luminance more finely by using, for example, a modeling on the basis of several Gaussian functions. The model used for this is a Gaussian Mixture Model (GMM), known to the person skilled in the art. The estimation of this model can be done with an Expectation-Maximization (EM) algorithm. The coefficients obtained via this algorithm can either be used directly as values $v_n(t)$ without particular weighting, or weighted using the weights associated with each Gaussian and determined by the EM algorithm. Finally, the number of Gaussians used may be fixed a priori or estimated dynamically by a known information criterion. However, the GMM procedure being complex to implement, the invention proposes that the distribution of the luminance be modeled by a histogram. Said histogram is calculated in a conventional manner, by using either the initial resolution of the luminance, that is to say the number of values that can be taken by the luminance over an image or a lower resolution by grouping together several neighboring values. Once this histogram has been constructed, several criteria may derive therefrom such as, for example, the energy, the variance, the center of gravity, the flattening coefficient (better known by the term Kurtosis) or the asymmetry coefficient (known by the term Skewness). These parameters make it possible to characterize the distribution of the luminance more or less finely.

The value $v_n(t)$ representative of a zone of the image may be diverse. It depends on the application. It may be based on the luminance, commonly denoted Y, on the chrominances, commonly denoted Cr and Cb, or on a linear combination of the luminance and of the chrominances. The coefficients of the linear combination are determined so as to best represent the content of the zone n of the image for an intended application. In a similar manner, the value $v_n(t)$, instead of being based on the components YCrCb of the image, may be based on the components of the various color spaces known by the person skilled in the art (RGB, LUV, Lab, . . . ). In a general way, this representative value can also result from a transformation applied to the components of the image. The objective of this transformation is, in this case, to accentuate a characteristic of the image that is beneficial for the intended application, such as for example the texture.

Finally, an extra criterion additional to the representative vector $V_N(t)$ may be put in place so as to determine whether the estimated (via the vector $V_N(t)$) difference between the current image and the reference image is distributed uniformly over the whole of the image or localized over a zone of this image only.

On the basis of one of the previously proposed criteria, a representative vector $V_N(t)$ is available for the current image, as well as a reference vector $R_N(k-1)$ corresponding to the last image selected. Each component of a vector represents a zone of the image. A third vector $\Delta V_N(t)=(\Delta v_0(t), \ldots, \Delta v_N(t))$ may be calculated, with $\Delta v_n(t)=|v_n(t)-r_n(k-1)|^\beta$, $\beta>0$ the absolute value, optionally raised to a power $\beta$, of the differences of the components of the vectors. The value of the power $\beta$ may be determined by simulation. The vector $\Delta V_N(t)$ thus obtained is thereafter normed. The distribution of the differences between the two images can then be interpreted by observing the homogeneity of the components of the normed vector: if the distribution of the differences is perfectly uniform, all the components of the vector are equal to 1/N where N is the size of the vector (equal to the number of image zones considered), and if the differences are perfectly localized on a single zone, all the components of the vector are zero except one. A normalized criterion is then defined making it possible to provide information about the homogeneity or the localization of the differences between two consecutive images. Said criterion uses two values:

$$\Delta V_N^{MAX} = \text{MAX}(\Delta v_n(t)), 0 \leq n < N$$

$$DC = \left(\Delta V_N^{MAX} - \frac{1}{N}\right) / \left(1 - \frac{1}{N}\right)$$

If there is uniform distribution of the differences between the current image and the reference image, $$\Delta V_N^{MAX} = \frac{1}{N}$$

and DC=0
If there is localization of the differences over a given zone, $\Delta V_N^{MAX}=1$ and DC=1.

The extra criterion consists in comparing the value of the variable DC with a predefined threshold, $S_{DC}$ lying between 0 and 1 and whose value is determined as a function of the scenario of use. If DC<$S_{DC}$, then it is concluded that the distribution of the differences between the current image and the reference image is uniform, in the converse case, it is concluded that the differences are localized over a given zone.

This extra criterion may be implemented notably in the case where a sensor is used in a fixed position, for which it is sought to select an image on a localized difference, even if the initial criterion does not activate the selection.

In a variant embodiment, it is possible to constrain the system to select an image even if the correlation coefficient α remains above the threshold S by using an image counter cpt_I. This counter is incremented with each image received, and is reset to one when a relevant image is selected. The method consists in fixing a maximum value cpt_I_max for said counter. When the counter reaches this maximum value, the current image I(t) is selected even if the criterion defined in step 5 is not satisfied.

In an analogous manner, it is possible to fix a minimum value cpt_I_min for the image counter. If the current image fulfills the selection criterion (step 5) but the image counter cpt_I has not exceeded the predefined minimum value, the current image I(t) is not selected. This variant embodiment presents notably the advantage of dealing with bigger bitrate constraints on the transmission link.

In another variant embodiment, the threshold S used to implement the criterion for selecting a relevant image may be rendered adaptive. In particular, the threshold S can vary over time as a function, for example, of a mean-bitrate constraint. The adaptation of the threshold over time may be carried out by using an algorithm of gradient type, known to the person skilled in the art, which is aimed at minimizing the difference between the number of images N selected, via step 5, per second and the desired number $N_S$ of images selected per second.

A time horizon $T_h$ is defined, an update of the threshold S being performed at the end of said horizon. For example, but not solely, this time horizon $T_h$ is taken equal to one second.

At each time interval $T_h$, a comparison test is performed, and the threshold S is modified as follows:

If N<$N_S$, S=S−δS

If N>$N_S$, S=S+δS, where δS is an increment fixed initially which corresponds to the adaptation spacing.

The adaptation spacing δS can also be adjusted dynamically over time.

Moreover, a minimum value and a maximum value of said threshold S are fixed so as to avoid divergence problems, if S<Smin then S=Smin, if S>Smax then S=Smax.

The value of the increment δS may be adapted as a function of the absolute value of the error E=|N−$N_S$| A simple example of a function is a linear function with saturation defined by:

δS=δSmax if |N−$N_S$|>E_max, δS=δSmin if |N−$N_S$|<E_min,

δS is linearly interpolated between δSmin and δSmax, if E_min≤|N−$N_S$|≤E_max, where δSmax, δSmin, E_max and E_min are input data.

Figure 5:
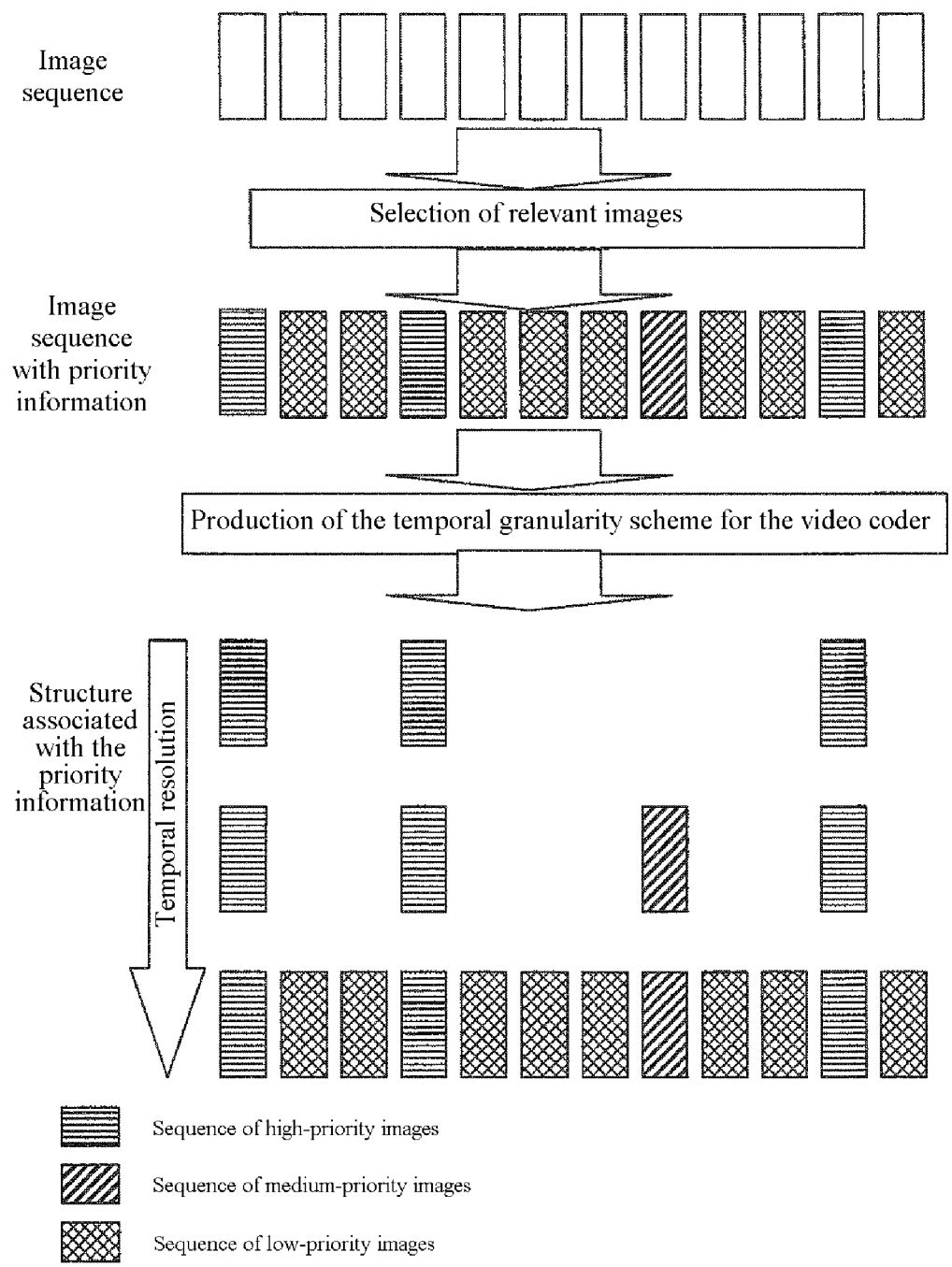

The key images selected by the method described previously must be transmitted with a maximum priority. The video coder, 14, suitable for implementing the method according to the invention, uses said key images defined by the previous step to generate a particular structure of group of images, or, "Group of Pictures" (GOP). The fact that the key images are defined on the fly during the transmission of the video stream compels the video coder to adapt the structures of the GOPs dynamically. The compressed stream obtained at the output of the video coder will be composed of several temporal resolutions, it being imperative for the minimum resolution to contain the whole set of key images and also for it to be compressed so as to ensure the best quality in relation to the bitrate available on the transmission channel. The temporal resolution which comprises the key images must be received by priority by the operator. FIG. 5 illustrates an exemplary depiction of a temporal granularity scheme under a constraint of priority on certain images previously identified as relevant. The constraint imposed on the video coder resides in the fact that each coded image belonging to a given temporal resolution cannot be predicted on the basis of a coded image belonging to the higher temporal resolutions.

In the embodiment where the module for selecting relevant images provides a degree of priority defining several classes of key images, and no longer just one, the video coder will then generate several temporal resolutions, hierarchized as a function of the degree of priority of the key images.

Figure 6:
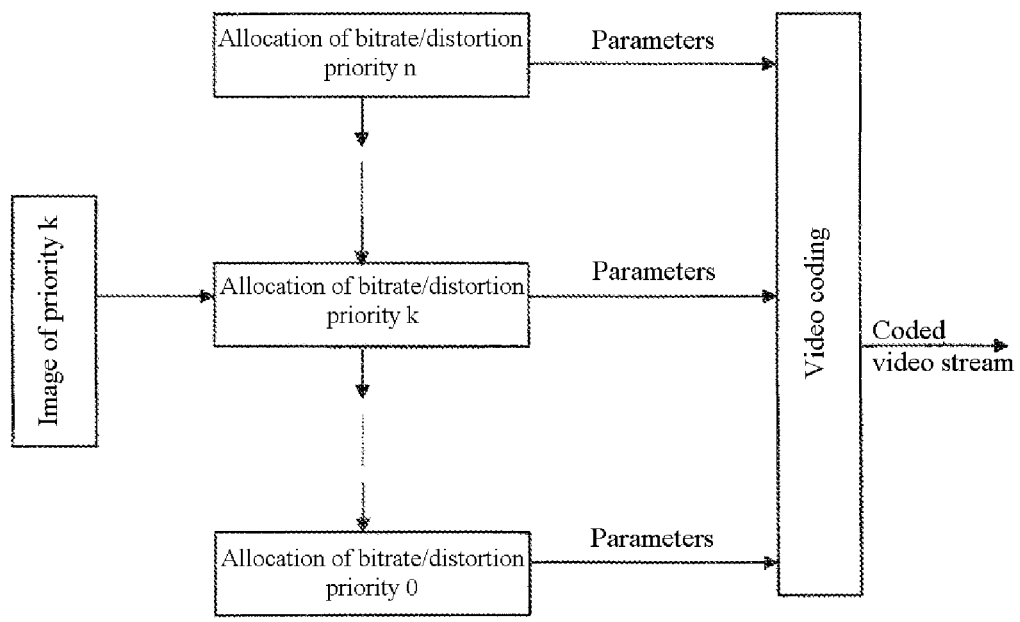

Once the structure of a GOP is defined, the coder, for each temporal resolution, defines a specific distortion and bitrate-based allocation which must make it possible to deal with the constraints imposed by the transmission, in terms of available bitrate notably. For each type of image received (key image or lower priority image), this allocation makes it possible to determine the type of coding to be applied, in particular spatial coding or coding by prediction of another frame. FIG. 6 schematically illustrates this principle.

The requests made by the operator to interact with the system according to the invention can conform to the JPIP communications protocol. Accordingly, a reminder of the functionalities of this protocol is given before introducing the adaptation which is made thereof within the framework of the invention.

Figure 7:
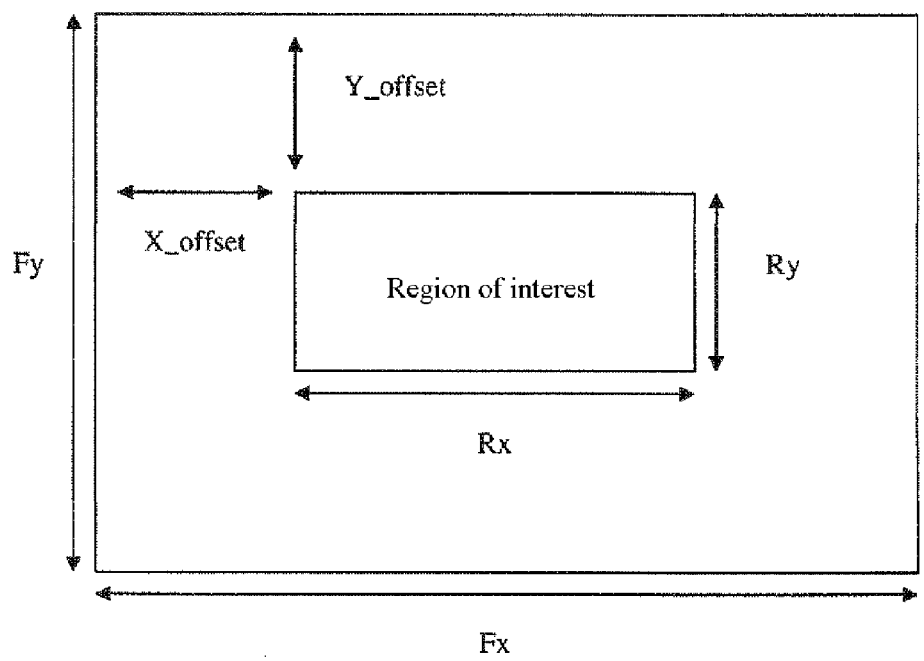

The typical architecture of a JPIP system is composed of several clients communicating with a server. The client application has a graphical interface where the decoded image is displayed and the server application returns data when the client modifies, through a zoom or a displacement, its viewing zone. The communication between the client and the server is composed of a succession of requests and of responses. The request defines the parameters of the viewing zone (such as the resolution, the size or the position of the zoom window) in a completely transparent manner with respect to the syntax of the JPEG2000 standard. One of the properties of the JPIP protocol is to provide portions of JPEG2000 images known to the person skilled in the art by the term regions of interest, in response to a request from the client. Three pairs of parameters make it possible to define a region of interest as illustrated by FIG. 7. The first pair of parameters (Fx and Fy) makes it possible to define the resolution to which the image, or the part of the image, is desired. The other two pairs of parameters will apply for this resolution. (X_offset and Y_offset) are the position parameters of the desired image part within the resolution defined by the pair (Fx,Fy) and (Rx, Ry) define its size also within the resolution defined by the pair (Fx,Fy).

In a conventional manner, in response to a JPIP request, the JPEG2000 server transmits by priority the low frequencies contained in the image and then the high frequencies in an incremental manner. In the implementation of the system according to the invention, the JPIP protocol is applied to a residual image, 9, obtained through the steps illustrated in FIG. 2. In this case, the low frequencies have already been dispatched partially or completely in the video stream transmitted, 5. It is therefore judicious to dispatch by priority the high frequencies of the image corresponding to the resolution requested by the operator all the more since they contain further information. However, the bitrate constraint imposed on the video coder must also be taken into account. Indeed, the lower the bitrate of the sequence containing the key images, the more the high frequencies will be impaired and in the worst case, the low frequencies may also be damaged. In this case, it is necessary to dispatch firstly the residuals of the low frequencies before dispatching the high frequencies corresponding to the user request. The JPIP module used within the framework of the invention is therefore adapted so as to determine the order of dispatching of the JPEG2000 packets as a function of the bitrate allocated by the video coder and of the resolution, quality and spatial zone parameters requested by the operator. The objective is to reduce to the maximum the transmission time, and this will allow the operator to make a fast decision.

In a variant embodiment, the operator can specify, during his request, that he desires to perform a search in the neighborhood of the image selected to be retransmitted. The aim of this search is to find, optionally, an image whose content is close but which will be more relevant according to a sharpness criterion. In this case, the following steps are implemented during the operator's request:

A calculation on the zone selected (by the operator) of the selected image of a criterion representative of the sharpness of said zone is performed.

The same calculation is applied to the same zones of the images situated in a temporal neighborhood close to the selected image.

The image whose selected zone is the sharpest according to the chosen criterion is selected and recovered via step 17 (FIG. 2). It is then processed thereafter in the method according to the invention described previously, and illustrated by FIG. 2.

The sharpness criterion used may be, for example, based on a similar principle to the one that can be used to carry out an autofocus function at the level of the optical zoom of a still camera or movie camera. A criterion, known to the person skilled in the art, such as that described in the following article: "*Autofocusing Algorithm Selection in Computer Microscopy*", Yu Sun, S. Duthaler and B. J. Nelson, In proceedings of IEEE IROS (International Conference on Intelligent Robots and Systems), pp. 70-76, 2005 may be used. To be effective, such a sharpness criterion must exhibit a maximum (respectively minimum) value when the image or the image zone over which this criterion is applied is perfectly sharp, and conversely it must exhibit a decreasing (respectively increasing) value as the image or the image zone becomes less sharp.

The system and the method according to the invention exhibit notably the following advantages:

The high-resolution sequence to be transmitted is adapted to the constraints of the transmission medium by selecting the information most relevant to the end user.

The operator can, by virtue of interactive requests, obtain additional temporal or spatial information further to that which he received initially.

All the processing operations performed are real-time compatible and require lightweight system resources, moreover the latency time introduced is minimal.

Overall, the proposed system makes it possible to adapt to the bitrate constraints, without, however, sacrificing the resolution and the quality of the images to which the operator can have access.

The invention claimed is:

1. A method for on-line transmission of a high-resolution video sequence comprising T images, where T is the total number of images of the high-resolution video sequence, the method comprising, for each image I(t) of said video sequence, determining whether to select said image I(t) for transmission by:

splitting each image I(t) to be transmitted at an instant t into N zones, where N is the total number of image zones in each image I(t);

calculating, for each zone n of the N zones, a value $v_n(t)$ representative of content of said zone;

generating, for each image I(t) to be transmitted, a vector $V_n(t)$ of size N representative of content of said image and containing the values $v_n(t)$ for each of the N zones, wherein $V_N(t)=[v_0(t), \ldots, v_{N-1}(t)]^T$, $[\cdot]^T$ is a transposition operator for a vector;

calculating a normalized coefficient of correlation $\alpha$ between a reference vector $R_N(k)=V_N(t_1)=[r_0(k), \ldots, r_{N-1}(k)]^T$ determined for an image previously selected for transmission at a previous instant $t_1$ $I^{sel}(k-1)=I(t_1)$ and the vector $V_N(t)$ calculated for the image I(t) according to $$\alpha = \frac{R_N^T(k-1) \cdot V_N(t)}{\sqrt{R_N^T(k-1) \cdot R_N(k-1)} \cdot \sqrt{V_N^T(t) \cdot V_N(t)}},$$

where k is a temporal index of a selected image;

determining whether to transmit the image I(t) by comparing the value of the normalized coefficient of correlation $\alpha$ with one or more thresholds having predetermined values; and replacing, if the image I(t) is transmitted, said image previously selected for transmission at a previous instant $t_1$ $I^{sel}(k-1)=I(t_1)$ by said image I(t).

2. The method of claim 1, wherein the values $v_n(t)$ are calculated by calculating criteria derived from a histogram containing luminance or chrominance values of pixels of the zone n of the image I(t), wherein said criteria are energy of said histogram, variance of said histogram, a damping coefficient of said histogram, an asymmetry coefficient of said histogram, a center of gravity of said histogram, or a linear combination of at least two of the energy of said histogram, the variance of said histogram, the damping coefficient of said histogram, the asymmetry coefficient of said histogram, and the center of gravity of said histogram.

3. The method of claim 1, wherein selecting the images for transmission further comprises:
   calculating, based on each pair of vectors $(R_N(k-1), V_N(t))$ obtained for a pair of images $(I^{sel}(k-1), I(t))$, a second vector $\Delta V_N(t)=(\Delta v_0(t), \ldots, \Delta v_N(t))$, where $\Delta v_n(t)=|v_n(t)-r_n(k-1)|^\beta$, $\beta$ being a predetermined positive integer;
   calculating a norm $\|\Delta V_N(t)\|$ of the vector $\Delta V_N(t)$ and dividing said vector $\Delta V_N(t)$ by said norm $\|\Delta V_N(t)\|$ to obtain a third vector $$\Delta' V_N(t) = \frac{\Delta V_N(t)}{\|\Delta V_N(t)\|} = (\Delta v'_0(t), \ldots, \Delta v'_N(t));$$

calculating additional criterion to determine whether there is uniform or localized distribution of differences between the pair of images according to $$DC = \left(\Delta V_N^{MAX} - \frac{1}{N}\right) \Big/ \left(1 - \frac{1}{N}\right),$$

where $$\Delta V_N^{MAX} = \text{MAX}(\Delta v'_n(t)), 0 \leq n < N;$$

determining that the differences between the pair of images is uniform if DC is less than a predetermined threshold $S_{DC}$; and
   determining that the differences between the pair of images is localized in a zone n if DC is greater than or equal to the predetermined threshold $S_{DC}$.

4. The method of claim 1, wherein determining whether to transmit the image I(t) comprises comparing the coefficient of correlation $\alpha$ with a predetermined threshold S, where S is a positive integer, by:
   selecting the image I(t) for transmission, updating the reference vector to $R_N(k)=V_N(t)$, and incrementing the temporal index to k=k+1, if the coefficient of correlation $\alpha$ is less than the predetermined threshold S; and
   discarding the image I(t) if the coefficient of correlation $\alpha$ is greater than or equal to the predetermined threshold S.

5. The method of claim 1, wherein selecting the images for transmission further comprises:
   defining an image counter cpt_I, initialized to 1, and a maximum value of said image counter cpt_I_max, when the image I(t) is determined to be transmitted;
   incrementing the image counter cpt_I by 1 when a new image I(t) is determined to be transmitted; and
   determining, for each image I(t), whether the coefficient of correlation $\alpha$ is greater than or equal to a predetermined threshold S and whether the image counter cpt_I is greater than or equal to the maximum value of said image counter cpt_I_max, to select said image I(t) for transmission.

6. The method of claim 1, wherein selecting the images for transmission further comprises:
   defining an image counter cpt_I, initialized to 1, and a minimum value of said image counter cpt_I_min, when the image I(t) is determined to be transmitted;
   incrementing the image counter cpt_I by 1 when a new image I(t) is determined to be transmitted; and
   determining, for each image I(t), whether the coefficient of correlation $\alpha$ is less than a predetermined threshold S and whether the image counter cpt_I is less than the minimum value of said image counter cpt_I_min, to discard said image I(t).

7. The method of claim 1, wherein selecting the images for transmission further comprises:
   defining a desired number $N_s$, of images selected per second,
   defining a time interval of duration equal to $T_h$ for updating a predetermined threshold S.
   calculating, at each time interval of duration equal to $T_h$, a number of images N selected during the previous time interval of duration equal to $T_h$, and
   modifying, at each time interval of duration equal to $T_h$, the value of the predetermined threshold S according to:
   if $N<N_s$, $S=S-\delta S$
   if $N>N_s$, $S=S+\delta S$, where $\delta S$ is a positive integer.

8. The method of claim 1, wherein determining whether to transmit the image I(t) comprises comparing the coefficient of correlation $\alpha$ and a positive number J of predetermined thresholds $S_j$, $1 \leq j < J$, according to:
   if $0 \leq \alpha < S_1$, the image I(t) is selected with a maximum degree of priority,
   if $S_j \leq \alpha < S_{j+1}$, for $1 \leq j < J-1$ the image I(t) is selected with a mean degree of priority j, and
   if $\alpha \geq S_J$, the image I(t) is not retained as relevant, where $S_j$ is a positive integer.

9. The method of claim 1, wherein determining whether to transmit the image I(t) further comprises:
   sorting the T images of said high-resolution video sequence in ascending order according to the value of the coefficient of correlation $\alpha$ of each image I(t), and
   grouping the T sorted images into J+1 groups hierarchized based on the value of the coefficient of correlation $\alpha$, each of said J+1 groups comprising the same number of images and corresponding to a mean degree of priority j'.

10. The method of claim 1, further comprising compressing the high-resolution video sequence before transmission by:
    performing a spatial under-sampling of said high-resolution video sequence to obtain a video sequence of lower resolution,
    selecting images of the video sequence of lower resolution, and
    performing a compression of said video sequence of lower resolution using a video coder configured to generate a particular structure of group of images, wherein the selected images define:
    a single temporal resolution if the selected images all have the same degree of priority, or
    several temporal resolutions if the selected images have different degrees of priority.

11. The method of claim 10, wherein the video coder is configured according to the H.264 standard.

12. The method of claim 10, further comprising storing the high-resolution video sequence is in a storage device, and transmitting or retransmitting an image or image zone of said video sequence of lower resolution by:
    performing a spatial over-sampling of said image to obtain a high-resolution image,
    calculating a difference between the over-sampled high-resolution image and a corresponding image of the stored high-resolution video sequence to obtain a residual,
    compressing said residual using an image coder to produce a compressed stream comprising packets containing information on the high frequencies of the image and other packets containing information on the low frequencies of said image, and
    transmitting said compressed stream to a remote operator.

13. The method of claim 12, further comprising comparing the image or the image associated with said image zone with temporally neighboring images within said high-resolution video sequence to determine the least blurred image by:
- calculating, for the image or the image zone, a criterion representative of the sharpness of said image or image zone, said sharpness exhibiting a first extremum when said image or image zone is perfectly sharp and a second extremum opposite the first extremum when said image or image zone is completely blurry,
- calculating a criterion representative of the sharpness of M temporally neighboring images, M being a predetermined value, and
- selecting the sharpest image based on the criterion and retransmitting the image or the associated image zone in place of the initially selected image.

14. The method of claim 12, wherein the image coder is configured to define the order of dispatching packets making up the compressed stream based on information regarding a predetermined available bitrate for transmission.

15. The method of claim 12, wherein the image coder is configured according to the JPEG2000 standard.

16. The method of claim 12, wherein the retransmission of an image or image zone is performed in response to a request from the remote operator.

17. The method of claim 16, wherein the request and the retransmission are implemented according to the JPIP standard.

18. An interactive system for transmitting high-resolution video sequences, comprising a sender and a receiver, wherein the interactive system is configured to, for each image I(t) of said video sequence, determine whether to select said image I(t) for transmission by being configured to:
- split each image I(t) to be transmitted at an instant t into N zones, where N is the total number of image zones in each image I(t);
- calculate, for each zone n of the N zones, a value $v_n(t)$ representative of content of said zone;
- generate, for each image I(t) to be transmitted, a vector $V_n(t)$ of size N representative of content of said image and containing the values $v_n(t)$ for each of the N zones, wherein $V_N(t) = [v_0(t), \ldots, v_{N-1}(t)]^T$, $[\cdot]^T$ is a transposition operator for a vector;
- calculate a normalized coefficient of correlation $\alpha$ between a reference vector $R_N(k) = V_N(t_1) = [r_0(k), \ldots, r_{N-1}(k)]^T$ determined for an image previously selected for transmission at a previous instant $t_1$ $I^{sel}(k-1) = I(t_1)$ and the vector $V_N(t)$ calculated for the image I(t) according to $$\alpha = \frac{R_N^T(k-1) \cdot V_N(t)}{\sqrt{R_N^T(k-1) \cdot R_N(k-1)} \cdot \sqrt{V_N^T(t) \cdot V_N(t)}},$$

where k is a temporal index of a selected image;
- determine whether to transmit the image I(t) by comparing the value of the normalized coefficient of correlation $\alpha$ with one or more thresholds having predetermined values; and
- replace, if the image I(t) is transmitted, said image previously selected for transmission at a previous instant $t_1$ $I^{sel}(k-1) = I(t_1)$ by said image I(t).

* * * * *